(12) United States Patent
Daly

(10) Patent No.: US 12,204,818 B2
(45) Date of Patent: *Jan. 21, 2025

(54) TRANSMITTING MESSAGES TO A DISPLAY DEVICE BASED ON DETECTED AUDIO OUTPUT

(71) Applicant: Roku, Inc., San Jose, CA (US)

(72) Inventor: Daniel Martin Daly, Brownsburg, IN (US)

(73) Assignee: Roku, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/596,725

(22) Filed: Mar. 6, 2024

(65) Prior Publication Data

US 2024/0220192 A1 Jul. 4, 2024

Related U.S. Application Data

(63) Continuation of application No. 17/514,791, filed on Oct. 29, 2021, now Pat. No. 11,954,400, which is a
(Continued)

(51) Int. Cl.
*G06F 3/16* (2006.01)
*H04R 3/12* (2006.01)
*H04R 27/04* (2006.01)

(52) U.S. Cl.
CPC .............. *G06F 3/165* (2013.01); *G06F 3/167* (2013.01); *H04R 3/12* (2013.01); *H04R 27/04* (2013.01);
(Continued)

(58) Field of Classification Search
CPC ........... G06F 3/165; G06F 3/167; H04R 3/12; H04R 27/04; H04R 2227/003; H04R 2227/005; H04R 2420/07
See application file for complete search history.

(56) References Cited

U.S. PATENT DOCUMENTS 5,365,282 A 11/1994 Levine
6,650,248 B1 11/2003 O'Donnell et al.
(Continued)

FOREIGN PATENT DOCUMENTS

KR 20190038002 A 4/2019

OTHER PUBLICATIONS

International Search Report and Written Opinion of the International Searching Authority directed to related International Patent Application No. PCT/US2021/058171, mailed Feb. 23, 2022, 7 pages.

*Primary Examiner* — Joseph Saunders, Jr.
(74) *Attorney, Agent, or Firm* — Sterne, Kessler, Goldstein & Fox P.L.L.C.

(57) ABSTRACT

Provided herein are system, apparatus, device, method and/or computer program product embodiments, and/or combinations and sub-combinations thereof, for transmitting messages to a display device based on detected audio output from the display device. In a given embodiment, a digital media player can transmit a message to the display device to control the audio output of the speaker using a transmission protocol, and transmit a set of instructions to the remote control device to confirm the display device processed the message by determining whether an attribute associated with the audio output from the speaker is within a predetermined threshold. In response to receiving a message that an attribute associated with the audio output is within a predetermined threshold, the digital media player can determine that the display device is enabled to receive communication via the transmission protocol.

20 Claims, 5 Drawing Sheets

Related U.S. Application Data continuation of application No. 17/146,080, filed on Jan. 11, 2021, now Pat. No. 11,169,771.

(60) Provisional application No. 63/113,628, filed on Nov. 13, 2020.

(52) U.S. Cl.
CPC .. *H04R 2227/003* (2013.01); *H04R 2227/005* (2013.01); *H04R 2420/07* (2013.01)

(56) References Cited

U.S. PATENT DOCUMENTS

| | | |
|---|---|---|
| 11,169,771 B1 | 11/2021 | Daly |
| 11,954,400 B2 | 4/2024 | Daly |
| 2007/0052547 A1 | 3/2007 | Haughawout et al. |
| 2012/0136612 A1 | 5/2012 | Vanderhoff et al. |
| 2017/0115954 A1 | 4/2017 | Innes et al. |
| 2019/0020543 A1 | 1/2019 | Asnis et al. |
| 2019/0149115 A1 | 5/2019 | Roberts |
| 2019/0279655 A1 | 9/2019 | Kristjansson et al. |
| 2019/0379887 A1 | 12/2019 | Marino et al. |
| 2020/0260019 A1 | 8/2020 | Marino et al. |

# TRANSMITTING MESSAGES TO A DISPLAY DEVICE BASED ON DETECTED AUDIO OUTPUT

CROSS-REFERENCE TO RELATED APPLICATIONS

This application is a continuation of U.S. patent application Ser. No. 17/514,791, filed on Oct. 29, 2021, which is a continuation of U.S. patent application Ser. No. 17/146,080, filed on Jan. 11, 2021, now U.S. Pat. No. 11,169,771, which claims priority to U.S. Provisional Patent Application No. 63/113,628, filed on Nov. 13, 2020, the contents of each of these applications are incorporated herein by reference in their entirety.

BACKGROUND

Technical Field

This disclosure is generally directed to the transmission of messages to a display device based on detected audio input rendered by the display device.

Background

Display devices such as televisions are often connected to digital media players using a High-Definition Media Input (HDMI) connection or other types of communication interfaces. The digital media player may need to determine how to communicate with the display device. For example, display devices may or may not support Consumer Electronics Control (CEC). The digital media player may need to determine whether it can communicate with the display device using CEC. In many use cases, CEC does not provide for adequate feedback from the display device, therefore, normal methods for determining whether a display device is CEC-enabled often require the participation of a user, and are as such undesirable.

SUMMARY

Provided herein are system, apparatus, device, method and/or computer program product embodiments, and/or combinations and sub-combinations thereof, for transmitting messages to a display device based on detected audio output rendered by the display device.

A given embodiment includes a method for determining whether a display device supports a communication over a particular channel. In at least one embodiment the method can determine whether a display device supports a communication over a particular transmission protocol associated with a particular communication channel. The method can operate by the digital media player transmitting a set of instructions to a remote control device, such a device including a microphone to detect audio output rendered by a speaker coupled to a display device, and receiving communication from the remote control device indicating the detected audio output rendered by the speaker. The method further includes the digital media player using a transmission protocol to transmit a message to the display device to change some aspect of the audio output rendered by the speaker (e.g., to vary the volume level of the audio output or to mute or unmute the audio). In response to the digital media player receiving a communication from the remote control device indicating that the remote control device has determined that an attribute associated with the detected audio output rendered by the speaker is within a prescribed threshold, further indicating that the display device successfully processed the message, the method further includes determining that the display device is configured to communicate via the transmission protocol.

Another embodiment includes a system for determining whether a display device supports a transmission protocol associated with a specific communication channel. The system can include a memory and a processor coupled to the memory. The processor can be configured to transmit a set of instructions to a remote control device, such a device including a microphone to detect audio output from a speaker coupled to a display device, and receive communication from the remote control device indicating the detected audio output from the speaker. The processor can be further configured to transmit a message to the display device to control the audio output of the speaker using a transmission protocol and/or a particular communication channel. In response to receiving a communication from the remote control device indicating that the remote control device has determined that an attribute associated with the detected audio output rendered by the speaker is within a prescribed threshold, further indicating that the display device successfully processed the message, the processor is further configured to determine that the display device is configured to communicate via the transmission protocol and/or the transmission protocol associated with a specific communication channel.

A further embodiment includes a tangible computer-readable device having instructions stored thereon that, when executed by at least one computing device, causes at least one computing device to perform operations. The operations include transmitting a set of instructions to a remote control device, such a device including a microphone to detect audio output from a speaker coupled to a display device, and receiving communication from the remote control device indicating the detected audio output from the speaker. The operations further include transmitting a message to the display device to control the audio output of the speaker using a transmission protocol and/or the transmission protocol associated with a specific communication channel. In response to receiving a communication from the remote control device indicating that the remote control device has determined that an attribute associated with the detected audio output rendered by the speaker is within a prescribed threshold, further indicating that the display device successfully processed the message, the operations further include determining that the display device is configured to communicate via the transmission protocol and/or the transmission protocol associated with a specific communication channel.

A further embodiment includes a remote control device. The remote control device includes a microphone and a controller coupled to the microphone. The remote control can be configured to control the microphone to detect audio output rendered by a speaker coupled to a display device and transmit communication indicating detection of the audio output. The remote control can determine whether an attribute associated with the audio output from the speaker is within the predetermined threshold based on audio output from the speaker detected by the microphone. In response to determining that the attribute associated with the audio output from the speaker is within the predetermined threshold, the remote control can further be configured to transmit a communication to a digital media player. The digital media player then determines that the display device is configured to communicate using the transmission protocol and/or the transmission protocol associated with a specific communication channel. In response to determining that the attribute associated with the audio output from the speaker is outside the predetermined threshold, the remote control can further be configured to transmit a communication to the digital media player. The digital media player then determines that the display device is not configured to communicate using the transmission protocol and/or the transmission protocol associated with a specific communication channel.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
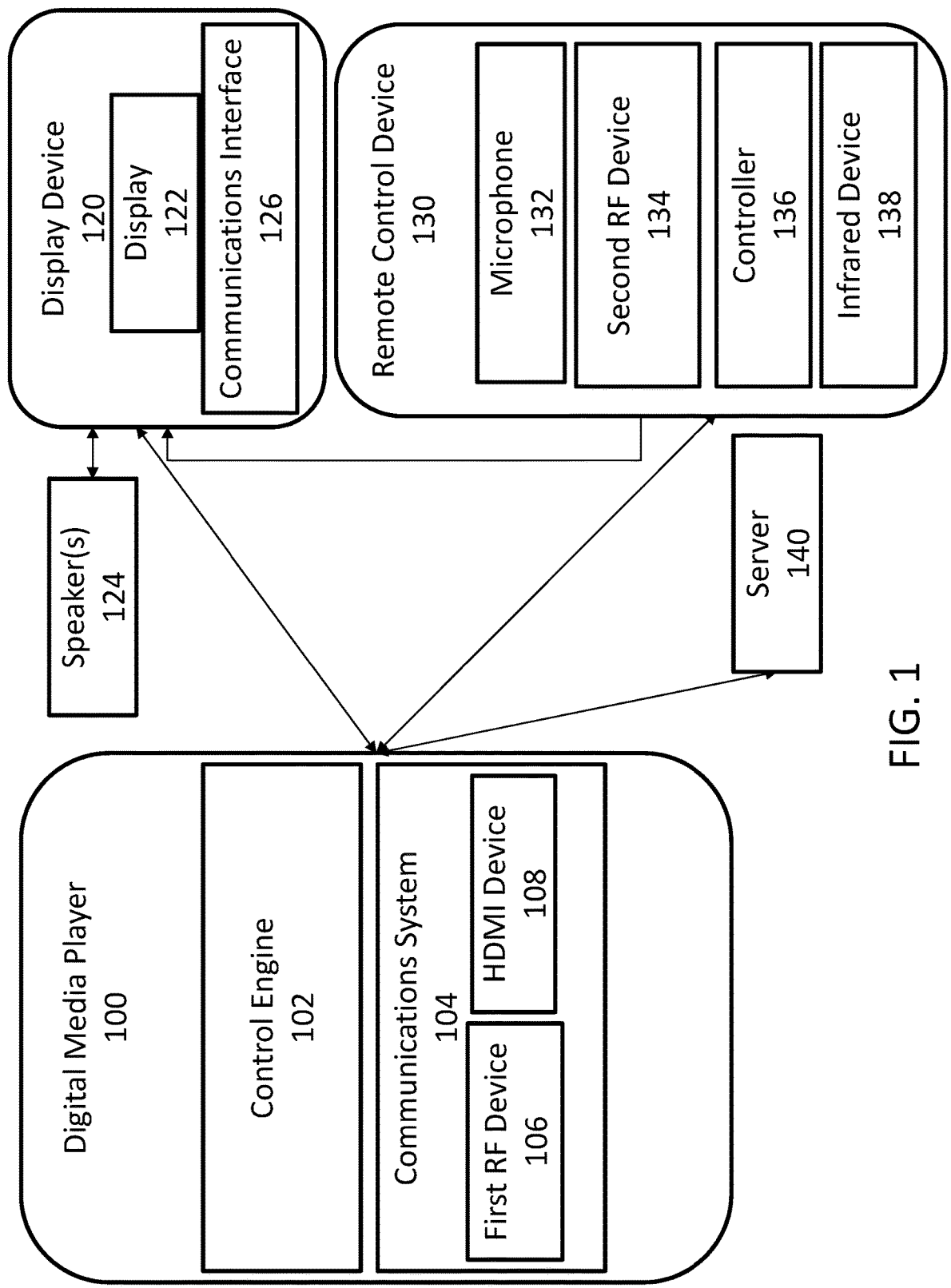
FIG. 1 is a block diagram of a system for transmitting messages to a display device based on detected audio output, according to some embodiments.

Provided herein are system, apparatus, device, method and/or computer program product embodiments, and/or combinations and sub-combinations thereof, for transmitting messages to a display device based on detected audio output.

As indicated above, a digital media player may need to determine whether a display device is enabled to receive messages using a particular transmission protocol such as Consumer Electronics Control (CEC), or a particular transmission protocol associated with a specific communication channel. Conventional methods that allow a digital media player to identify the transmission protocol enabled by a display device are often unreliable and require user feedback. Using conventional methods when a first device is configured to control a second device, user intervention is required to validate a successful configuration. Additionally, the quality of connection between the device requires user feedback. The disclosure herein describes at least one technique for automatically verifying the effectiveness of the control channel or specific transmission protocol (e.g., connectivity, configuration, quality) or effectiveness by employing a sensor (e.g., microphone), to monitor (e.g., listen) for correct behavior of a second device (e.g., sound rendering device), and report to the first device the presence, absence, intensity, character of the light, or character of the sound, thereby providing feedback as to the success.

In a given embodiment, a digital media player can transmit a set of instructions to a remote control device, such a device including a microphone, to detect audio output from a speaker coupled to a display device. The microphone of the remote control device can detect the audio output from the speaker and can transmit a communication to the digital media player indicating the detection of the audio output. The digital media player can receive communication from the remote control device, indicating the detected audio output from the speaker. The digital media player can transmit a message to the display device to control the audio output of the speaker using a transmission protocol and/or the transmission protocol associated with a specific communication channel. The remote control device can determine whether an attribute associated with the audio output of the speaker is within a predetermined threshold. In response to determining that the attribute associated with the audio output is within the predetermined threshold, the remote control device can transmit a communication to the digital media player. In response to determining that the audio output is outside the predetermined threshold, the remote control device can transmit a communication to the digital media player.

In response to receiving the communication from the remote control indicating that an attribute associated with the audio output of the speaker is within a predetermined threshold, further indicating that the display device successfully processed the message, the digital media player can determine that the display device is configured to communicate via the transmission protocol and/or a transmission protocol associated with a specific communication channel.

The above configuration allows a digital media player to determine whether a display device such as a television is enabled to receive messages using a particular transmission protocol, without user feedback. Furthermore, the above configuration is reliable, as the digital media player can confirm whether a message transmitted using the transmission protocol was successfully processed by the display device. In another example, the above configuration allows a digital media player to determine whether a display device such as a television is enabled to receive messages using a particular transmission protocol over a particular channel, without user feedback. Furthermore, the above configuration is reliable, as the digital media player can confirm whether a message transmitted using a transmission protocol over a particular channel was successfully processed by the display device.

FIG. 1 is a block diagram of a system for transmitting messages to a display device based on detected audio output, according to some embodiments. In an embodiment, the system can include a digital media player 100, display device 120, remote control device 130, and server 140. Digital media player 100 and remote control device 130 can be connected through a wireless connection using Radio Frequency (RF) devices. In at least one embodiment the devices can be connected using Z-wave, Zigbee, Bluetooth, Bluetooth LE, Wi-Fi, or another wireless technology standard. Digital media player 100, display device 120, and server 140 can be connected through wired connections, wireless connections, or a combination of wired and wireless connections.

As an example, digital media player 100 can be connected to display device 120 and server 140 via a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As another example, digital media player 100 can be connected to display device 120 through a wired connection such as HDMI. Furthermore, digital media player 100 can be connected to display device 120 using Near Field Technology (NFC) such as Bluetooth®, Infrared, RF, or the like. Additionally, remote control device 130 can communicate with display device 120 using infrared device 138. In at least one embodiment, the remote control device can be connected to the display device or the digital media player via Bluetooth, Wi-Fi, or other wireless technology standard allowing for exchanging data between devices over short distances.

Digital media player 100 can include a control engine 102 and communications interface 104. In at least one embodiment, the digital media player is a computing device. Control engine 102 may be the firmware of digital media player 100. The firmware of digital media player 100 may be programmable code that controls the operation of digital media player 100. Digital media player 100 may receive updates for control engine 102 from server 140. Communications interface 104 can include a first RF device 106 and HDMI device 108. Digital media player 100 can communicate with the display device 120 through communications interface 104 to provide streaming video, audio, or video and audio content to display device 120. The content can be live or recorded programs provided from media servers, such as server 140 or broadcast channels. The content can include but is not limited to live broadcast programs, recorded programs, pay-per-view programs, on-demand programs, advertisements, etc.

Control engine 102 can identify a mode of communication enabled by display device 120 and deliver the content along with other information associated with the content using the identified mode of communication. As an example, the mode of communication can be a transmission protocol, such as the CEC transmission protocol. Control engine 102 can receive messages from remote control device 130 to control the content rendered by display device 120.

CEC transmission protocol allows digital media player 100 to transmit messages to display device 120 through HDMI ports. CEC is a shared bus that is directly connected between HDMI ports of digital player 100 and display device 120. The following are messages commonly transmitted over the CEC transmission protocol: One Touch Play, System Standby, Preset Transfer, One Touch Record, Timer Programming, System Information, Deck Control, Tuner Control, OSD Display, Device Menu Control, Routing Control, Remote Control Passthrough, Device OSD Name Transfer, System Audio Control. The messages transmitted over the CEC transmission protocol may be associated with playback of content including audio and video data. The content may be live broadcast, prerecorded, on-demand, pay-per-view, or the like.

Display device 120 can include display 122 and can be coupled to speaker(s) 124. Speaker(s) 124 can be built into display device 120. Alternatively, speaker(s) 124 can be coupled to display device 120 through a wired or wireless connection. For example, speaker(s) 124 can be coupled to display device 120 through NFC connection, such as Bluetooth®. Speaker(s) 124 can be a single unitary speaker. Alternatively, speaker(s) 124 can be part of a group of speakers in an arrangement such as Surround Sound.

Display device 120 can be configured to receive messages associated with video content from digital media player 100 using communications interface 126. Communications interface 126 can enable a transmission protocol or a communication system to receive messages associated with rendering content. The communication system can be an alternative communication system to the transmission protocol and/or particular communication channel initially tested. For example if it is determined that transmission protocol A is not functioning as expected, the communication system can be an alternative transmission protocol over the same communication channel, or an alternative communication channel. Communication system can include an infrared communication system, wired communication channel, short range wireless communication, Wi-Fi, or another communication protocol capable of transmitting messages between devices. The content can include audio and video data. The messages can include a combination of displaying video data, rendering audio data through the speaker(s) 124, controlling the volume of the audio data, controlling the picture settings of the video data, or the like. Display device 120 can process and execute commands in the messages received from digital media player 100. Display device 120 can be a television, monitor, laptop, mobile device, or the like.

Remote control device 130 can include microphone 132, second RF device 134, controller 136, and infrared device 138. Remote control device 130 can be configured to receive user inputs, which correspond to commands associated with the content to be rendered by display device 120. The user inputs can be transmitted to digital media player 100 using second RF device 134. Control engine 102 can correlate the user inputs to the desired commands and instruct display device 120 to execute the desired commands. Alternatively, controller 136 can correlate the user inputs to the desired commands and transmit the desired commands to digital media player 100 using second RF device 134. In some embodiments, remote control device 130 may communicate with display device 120 using infrared device 138. For example, control engine 102 can correlate the user inputs to the desired commands, and instruct remote control device 130 to transmit the commands to display device 120, using infrared device 138.

Microphone 132 can receive audio rendered by speaker(s) 124. Controller 136 can process the audio input and generate a corresponding request or response. Controller 136 can transmit the request or response to digital media player 100 using second RF device 134.

Figure 2:
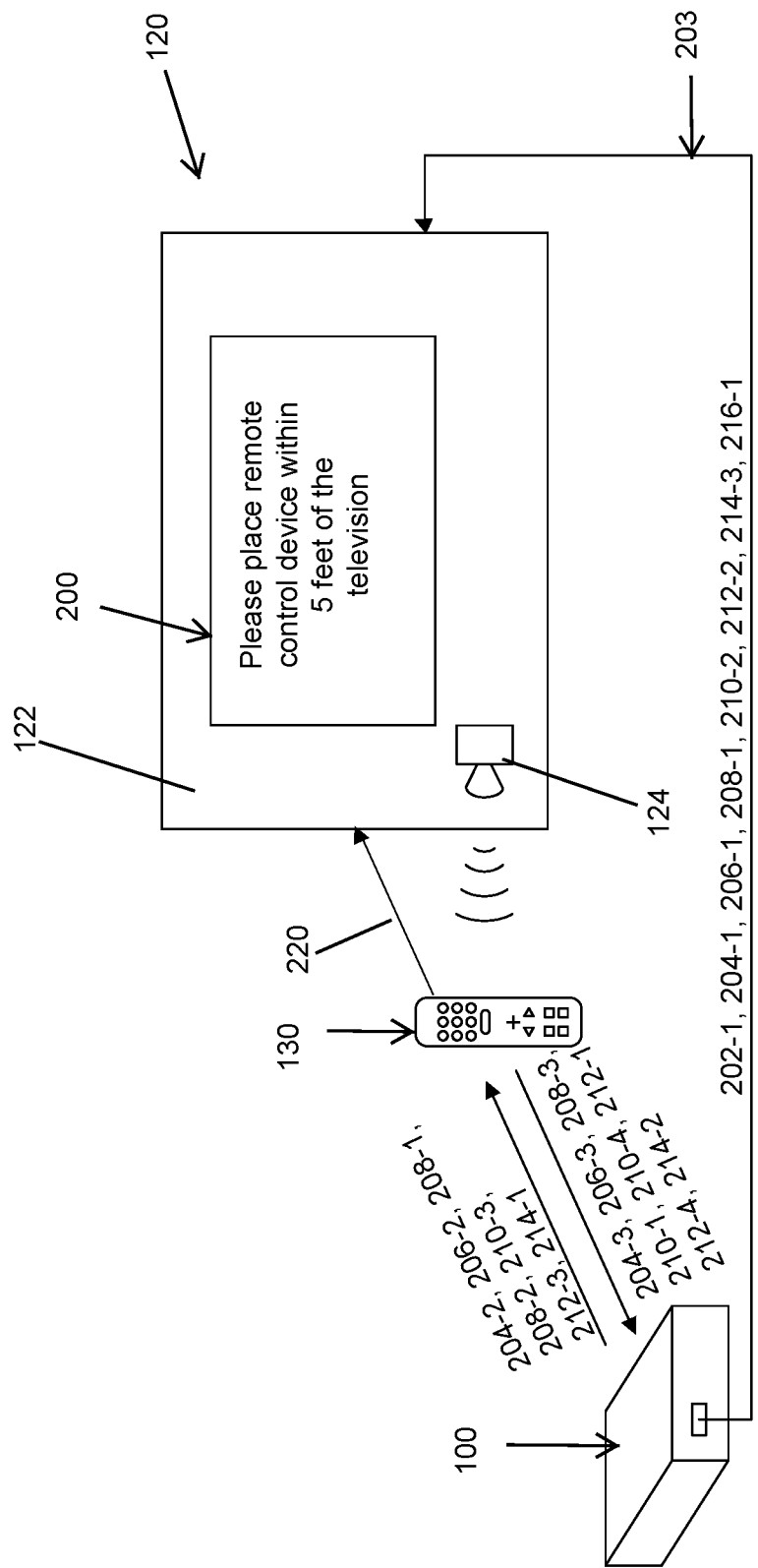
FIG. 2 is a block diagram of data flow in the system for transmitting messages to a display device based on detected audio output, according to some embodiments.

FIG. 2 is a block diagram illustrating a data flow system for determining whether a display device enables a transmission protocol. FIG. 2 will be described with respect to FIG. 1.

In a given embodiment, a user can attempt to set up their digital media player 100 with display device 120. The display device 120 can be a television. Digital media player 100 can be connected to display device 120 using HDMI connection 203. In some embodiments, the communication from digital media player 100 to display device 120 may be one-way communication over the HDMI connection 203. Digital media player 100 can form an HDMI connection 203 with the display device 120 by receiving one end of an HDMI cord in an HDMI port while the other end of the HDMI cord is received by display device 120 in an HDMI port. Display device 120 may or may not be enabled to receive messages through HDMI connection 203. In some embodiments, display device 120 may be configured to receive messages from remote control device 130 through infrared communication 220.

In response to forming a connection with display device 120, control engine 102 of digital media player 100 can detect audio-rendering devices. For example, in response to forming a connection with display device 120, control engine 102 can detect display 122 and speaker 124. As indicated with respect to FIG. 1, speaker 124 can be built-in display device 120 or located outside display device 120. In either case, speaker 124 can be coupled to display device 120.

In response to detecting display 122 and speaker 124, control engine 102 can transmit request 202-1 to display device 120 to initiate a guided setup of digital media player 100. The guided setup can require display device 120 to be connected to an internet connection to download the appropriate software. Alternatively, the appropriate software can be included in request 202-1. In at least one embodiment the sensor (e.g., microphone) associated with the remote control device is initiated in response to the guided setup being initialized, and/or is disabled in response to the guided setup being completed.

Display device 120 can receive request 202-1 and display prompts on display 122 to walk the user through the guided setup. As part of the guided setup, digital media player 100 can attempt to determine whether a particular transmission protocol is enabled by display device 120. The transmission protocol can be used to transmit messages to display device 120 for processing. The messages can be associated with the audio and video data to be rendered by display device 120. For example, the commands can include volume control, mute, unmute, record, playback, rewind, forward, tuner control, or the like. As a non-limiting example, the transmission protocol can be the CEC transmission protocol. As such, digital media player 100 may attempt to determine whether digital media player may transmit messages to display device 120 through HDMI connection 203.

The guided setup can render a prompt 200 on display 122 instructing a user to place remote control device 130 within a predetermined distance from display device 120. Control engine 102 can transmit request 204-1 to display device 120 to render audio data from speaker 124. Request 204-1 may include a combination of audio and video data to be rendered by display device 120. Display device 120 can receive request 204-1 and output the audio data from speaker 124.

Control engine 102 can transmit request 204-2 to remote control device 130. Request 204-2 can include instructions to detect audio data being output by speaker 124 within a predetermined timeframe. Request 204-2 can transmit to remote control device 130 using first RF device 106.

Remote control device 130 can receive request 204-2 using second RF device 134. Based on the instructions in request 204-2, controller 136 can instruct microphone 132 of remote control device 130 to detect the audio data rendered by speaker 124. In response to microphone 132 detecting the audio data rendered by speaker 124, controller 136 of remote control device 130 can generate response 204-3. Response 204-3 can include a confirmation message confirming that microphone 132 was able to detect the audio data rendered by speaker 124. Response 204-3 can be transmitted to digital media player 100 using second RF device 134 of remote control device 130.

In some embodiments, request 204-2 can include instructions for remote control device 130 to detect audio data being output by speaker 124 with a particular audio signature, such as a particular song, sound, music, or the like. Microphone 132 can detect audio data, and controller 136 can parse the audio data to identify its frequency, amplitude, some other characteristic, or any combination of characteristics. Controller 136 can determine the audio signature of the audio data using the frequency, amplitude, or other characteristics in any combination. Controller 136 can match the determined audio signature with the audio signature included in request 204-2. In response to matching the audio signature to within a threshold, controller 136 of remote control device 130 can generate response 204-3. Response 204-3 can include a confirmation message confirming that microphone 132 was able to detect the audio data rendered by speaker 124 with the particular audio signature.

In some embodiments, microphone 132 can detect and capture the audio data output from speaker 124. Controller 136 can include the captured audio data in response 204-3. Controller 136 can transmit response 204-3 to digital media player 100. Control engine 102 can parse the audio data included in response 204-3 to identify its frequency, amplitude, or other characteristics in any combination. Control engine 102 can determine the audio signature of the audio data using the frequency and amplitude or other characteristics in any combination. Control engine 102 can match the determined audio signature with the audio signature of the audio data supposed to be rendered by speaker 124 based on request 204-1. In response to matching the audio signature within a threshold, control engine 102 can confirm that speaker 124 is appropriately outputting the audio data included in request 204-1.

In response to control engine 102 confirming that the speaker 124 is outputting the audio data, control engine 102 can transmit request 206-1 to display device 120. Request 206-1 can be a message that includes a command associated with the audio data being output by speaker 124. The command can be to change the volume or mute the audio. Request 206-1 can be transmitted to display device 120 using the transmission protocol.

In the event display device 120 is enabled to receive messages through the transmission protocol, display device 120 can receive request 206-1 and process the message. For example, if the command in the message is associated with volume control, display device 120 can process the message to adjust the volume of the audio data being output by speaker 124 by an amount instructed in request 206-1. If the message includes a mute command, display device 120 can mute speaker 124.

In the event the display device 120 is not enabled to receive messages through transmission protocol, display device 120 cannot receive or process the message included in request 206-1. That is, the audio data being output by speaker 124 can be unchanged and unaffected.

Control engine 102 can transmit request 206-2 to remote control device 130 to determine whether display device 120 processed the message included in request 206-1 by determining that an attribute associated with the audio data is within a predetermined threshold. For example, if the command in the message is associated with volume control, request 206-2 can include instructions to determine whether the volume of the audio data being output by speaker 124 is within the predetermined threshold. If the message includes a mute command, request 206-2 can include instructions to determine whether the audio data being output has stopped being output from speaker 124.

Remote control device 130 can receive request 206-2, and controller 136 can instruct microphone 132 to detect and capture the audio being output by speaker 124. Controller 136 can determine whether the attribute associated with the audio data is within a predetermined threshold. The attribute can be the volume of the audio data. For example, controller 136 can determine whether the attribute is within a predetermined threshold of volume. In the event the message includes a mute command, the predetermined threshold can be an absence of audio from speaker 124. For example, controller 136 can determine whether speaker 124 is muted based on a lack of audio data detected from speaker 124.

In some embodiments, microphone 132 can be configured to detect and capture the audio being output by speaker 124 and controller 136 can be configured to determine whether the attribute associated with the audio data is within a predetermined threshold, independent of request 206-2.

In some embodiments, microphone 132 can detect and capture sounds that are not output from speaker 124. For example, microphone 132 can detect user conversations, sounds outside the user's house, sounds inside the user's house, etc. Controller 136 can be configured to differentiate between the audio data detected from speaker 124 and other sounds based on data associated with the audio data, such as the amplitude and frequency of the audio data output by speaker 124.

In response to determining that the attribute of the audio data is within the predetermined threshold, controller 136 can generate an affirmative communication, confirming that display device 120 processed the message transmitted by digital media player 100. Alternatively, in response to determining that the attribute is outside the predetermined threshold, controller 136 can generate a failure communication indicating that the display device 120 failed to process the message transmitted by digital media player 100. Controller 136 can generate response 206-3. Response 206-3 can include the affirmative message or failure message. Response 206-3 can be transmitted to digital media player 100 using second RF device 134.

Digital media player 100 can receive response 206-3. If response 206-3 includes an affirmative communication, control engine 102 can determine that display device 120 is enabled to receive messages using the transmission protocol. Specifically, digital media player 100 can determine that display device 120 may receive messages via HDMI connection 203 using the transmission protocol (e.g., CEC transmission protocol). Digital media player 100 can transmit all future messages associated with the output of audio or video data to display device 120 using the transmission protocol.

If response 206-3 includes a failure communication, control engine 102 can determine that display device 120 is not enabled to receive messages using the transmission protocol and instead may be configured to receive messages using a communication system that is different than the transmission protocol. For example, control engine 102 may transmit future messages to remote control device 130 to transmit to display device using infrared device 138. Digital media player 100 can transmit all future messages associated with the output of audio or video data to display device 120 via remote control device 130's infrared device 138.

In some embodiments, digital media player 100 can confirm that display device 120 is configured to receive messages through a communication system (e.g., infrared communication 220) by transmitting request 208-1, including a message with a command associated with the audio data rendered by speaker 124 to display device 120 via remote control device 130's infrared device 138. The message can be the same message in request 206-1 or a different message.

In the event that display device 120 is enabled to receive messages via remote control device 130's infrared device 138, display device 120 can receive request 208-1 and process the message. For example, if the command in the message is associated with volume control, display device 120 can process the message to adjust the volume of the audio data being output by speaker 124 by an amount instructed in request 208-1. If the message includes a mute command, display device 120 can mute speaker 124.

In the event that the display device 120 is not enabled to receive messages via remote control device 130's infrared device 138, display device 120 cannot receive or process the message included in request 208-1. That is, the audio data being output by speaker 124 can be unchanged and unaffected.

Control engine 102 can transmit request 208-2 to remote control device 130 to determine whether display device 120 processed the message included in request 208-1 by determining whether an attribute associated with the audio data is within a predetermined threshold. Remote control device 130 can receive request 208-2, and controller 136 can instruct microphone 132 to detect and capture the audio being output by speaker 124. Controller 136 can determine whether the attribute associated with the audio data is within a predetermined threshold.

In response to determining that the attribute of the audio data is within the predetermined threshold, controller 136 can generate an affirmative message, confirming that display device 120 processed the message transmitted by digital media player 100. Alternatively, in response to determining that the attribute is outside the predetermined threshold, the controller 136 can generate a failure message indicating that the display device 120 failed to process the message transmitted by digital media player 100. Controller 136 can generate response 208-3. Response 208-3 can include the affirmative message or failure message. Response 208-3 can be transmitted to digital media player 100 using second RF device 134.

Digital media player 100 can receive response 208-3. If response 208-3 includes an affirmative message, control engine 102 can determine that display device 120 is enabled to receive messages via remote control device 130's infrared device 138. Digital media player 100 can transmit all future messages associated with audio or video playback via remote control device 130's infrared device 138. In response to receiving a failure message, control engine 102 can determine that display device 120 is not enabled to receive messages via remote control device 130's infrared device 138.

In some embodiments, digital media player 100 can also confirm whether display device 120 is operational based on the audio data output by speaker 124. Remote control device 130 can receive a user input associated with a message for changing a channel or playback particular video content, including audio and video data. Remote control device 130 can transmit request 210-1, including the user input and/or message to digital media player 100 using second RF device 134.

Digital media player 100 can receive request 210-1. Control engine 102 can transmit request 210-2 to display device 120, via a communication system (e.g., infrared communication 220) or the transmission protocol and/or a transmission protocol associated with a specific communication channel (e.g., HDMI). Request 210-2 can include the message for changing a channel (e.g., tv channel) or playback particular video content. Display device 120 can process the message and attempt to change the channel or playback the particular video content.

Control engine 102 can transmit a request 210-3 to remote control device 130 using first RF device 106. The request 210-3 can include instructions to determine whether display device 120 processed the message successfully based on detected audio output by speaker 124.

Remote control device 130 can receive request 210-3, and controller 136 can instruct microphone 132 to detect audio data being output by speaker 124. In the event microphone 132 successfully detects audio data being output by speaker 124, controller 136 can generate a success message. In the event microphone 132 fails to detect audio data being output by speaker 124, controller 136 can generate a failure message. Controller 136 can generate response 210-4, including the success message or failure message and transmit response 210-4 to digital media player 100 using second RF device 134.

Digital media player 100 can receive response 210-4. In the event response 210-4 includes a success message, control engine 102 can determine display device 120 successfully processed the message and is outputting the desired video content (based on changing the channel or playing back particular video content). In the event response 210-4 includes a failure message, control engine 102 can determine display device 120 has either failed to process the message or there is some technical difficulty with playing back the desired video content. The technical difficulty can be caused by technical issues with display device 120, loss of connection, technical issues caused by a broadcast provider, or the like. Control engine 102 can attempt to execute remedial measures to resolve any technical difficulty, such as transmitting a message to server 140 to determine whether there is an issue with a broadcast provider, loss of connection, or power outage. This allows the system to initiate troubleshooting any issues before a user-initiated request.

In some embodiments, digital media player 100 can set up a surround sound speaker system detected audio output. As indicated above, speaker 124 can be a surround sound speaker system, including multiple speakers distributed around a given space (e.g., room, house, auditorium, or the like).

A user can provide inputs using remote control device 130, indicating a desire to set up a surround sound system. The surround sound system can include multiple different types of speakers, including subwoofer(s), amplifier(s), center channel speakers, specialized speakers, or the like. Each of the speakers can have a different role for outputting audio data. For example, a center speaker can be configured to output dialogue of a movie while the left and right speakers output music and effects as well as dialogue when characters of a movie move to the left or right of the screen. Each of the speakers can need to be set at different audio settings. The audio settings can include treble, bass, volume, or the like.

Remote control device 130 can transmit request 212-1 to digital media player 100 using second RF device 134 to setup the surround sound system. The request 212-1 can include the message and/or user input indicating a desire to set up the surround sound system. Digital media player 100 can receive request 212-1, and control engine 102 can transmit request 212-2 to display device 120. Request 212-2 can include instructions to output audio data from a specific speaker in the surround sound system at a desired audio setting, one speaker at a time. The instructions can include an order in which each speaker is configured to output the audio data. For example, the instructions can include outputting the audio data using the front speaker and confirming the audio settings of the front speaker, outputting the audio data using the front right speaker and confirming the audio settings of the front right speaker, outputting the audio data using the front left speaker and confirming the audio settings of the front left speaker, etc. Request 212-2 can also include instructions to display prompts on display 122 for the user to position remote control device 130 within a predetermined distance of a given speaker of the surround sound system when the given speaker is configured to output audio data. In at least one embodiment the RF device can be any short range wireless communication device.

Control engine 102 can transmit request 212-3 to remote control device 130, including instructions to detect audio settings of audio data output by a given speaker of a surround sound system. The instructions can include an order in which the audio data is to be output by each speaker of the surround sound system and the desired audio settings for the given speaker.

Display device 120 can receive request 212-2. Display device 120 can output audio data from each speaker individually, in the order included in request 212-2. For example, display device 120 can output audio data from a front speaker using the instructed audio settings. Display device 120 can also display a prompt on display 122 instructing the user to position remote control device 130 within a predetermined distance of the front speaker.

Controller 136 can instruct microphone 132 to detect and capture the audio output by the front speaker. Controller 136 can parse the audio data to determine whether the audio data was output by the front speaker at the correct audio settings by comparing the audio characteristics of the captured audio data with the desired audio settings received in request 212-3. In the event controller 136 determines that the audio data was output at the correct audio settings, controller 136 can generate a success message. In the event controller determines that the audio data was not output at the correct audio settings, controller 136 can generate a failure message. Controller 136 can include the success or failure message in response 212-4. Controller 136 can transmit response 212-4 to digital media player 100.

Digital media player (e.g., computing device) 100 can receive response 212-4. In the event response 212-4 includes a success message, control engine 102 can determine that the front speaker is correctly configured. In the event, response 212-4 includes a failure message, control engine 102 can instruct display device 120 to adjust the audio settings of the front speaker.

Display device 120, remote control device 130, and digital media player 100 can repeat the process for each speaker in the surround sound system to confirm the audio settings of the speakers of the surround sound system.

In some embodiments, digital media player 100 can control the playback of video content based on detected audio output. A user can carry remote control device 130 in their pocket, a holder attached to their clothing, or the like. Control engine 102 can transmit request 214-1 to detect the volume of the audio data output by speaker 124 using first RF device 106 to remote control device 130. Request 214-1 can include instructions to detect volume of audio output by speaker 124 continuously. The instructions can further include determining a change in the volume more than a threshold amount.

Remote control device 130 can receive request 214-1, and controller 136 can instruct microphone 132 to detect and capture audio data output by speaker 124 continuously. Controller 136 can determine the volume of the captured audio data. In response to determining a volume change greater than a threshold amount, controller 136 can generate a response 214-2. Response 214-2 can include an amount of change in the volume of audio data. Controller 136 can transmit response 214-2 to digital media player 100 using second RF device 134.

Digital media player 100 can receive response 214-2. Control engine 102 can determine whether the cause of change to the volume was caused factors such as: in response to a user command, completion of a television program, television malfunction, etc. In the event control engine 102 determines that the above factors did not cause the cause in the change to the volume, control engine 102 can determine the user has moved farther away from display device 120. In response to determining the change to the volume is more than a predetermined amount, control engine 102 can determine that the user has moved away from the display device and is no longer able to view display device 120. As a result, control engine 102 can transmit request 214-3, including a message with a command to pause or stop the playback of the video content from displaying device 120, via a communication system (e.g., infrared communication 220) or the transmission protocol or a particular communication channel. Display device 120 can receive request 214-3 and pause or stop the playback of the video content based on the message. In some embodiments, the message in request 214-3 can include a command to increase the volume of the audio output.

In some embodiments, speaker 124 can be a speaker system with multiple different speakers distributed around a building or house in multiple different rooms. In response to control engine 102 determining that the user has moved away from the display device and is no longer able to view the display device, control engine 102 can determine the user has moved into another room. Control engine 102 determines the location of the user within the house or building based on the volume of the audio output detected by microphone 132. Control engine 102 can determine the speaker closest to the user (e.g., a speaker in the room the user is located), based on the user's determined location. Control engine 102 can transmit request 216-1 to display device 120 to output the audio data from the speaker closest to the user via a communication system (e.g., infrared communication 220) or the transmission protocol. Display device 120 can receive request 216-1 and can process the message by outputting the audio data from the speaker closest to the user.

In some embodiments, microphone 132 can be instructed to detect and capture audio data being output by speaker 124 continuously. Controller 136 can determine whether the volume of the captured audio data has dropped below a given threshold and transmit a message to digital media player 100. Digital media player 100 can transmit a message to display device 120 to increase the volume. This can assist hearing-challenged individuals that want the audio data to be output at a desired volume however cannot notice a decrease in volume. Furthermore, this can also assist individuals with vision impairments that the audio data to be output at a desired volume, however, can require assistance in providing user input to increase the volume. In this regard, a user can set a desired a default volume level and digital media player can ensure the volume level is maintained within the threshold of the default volume level based on the audio data detected by microphone 132.

Figure 3:
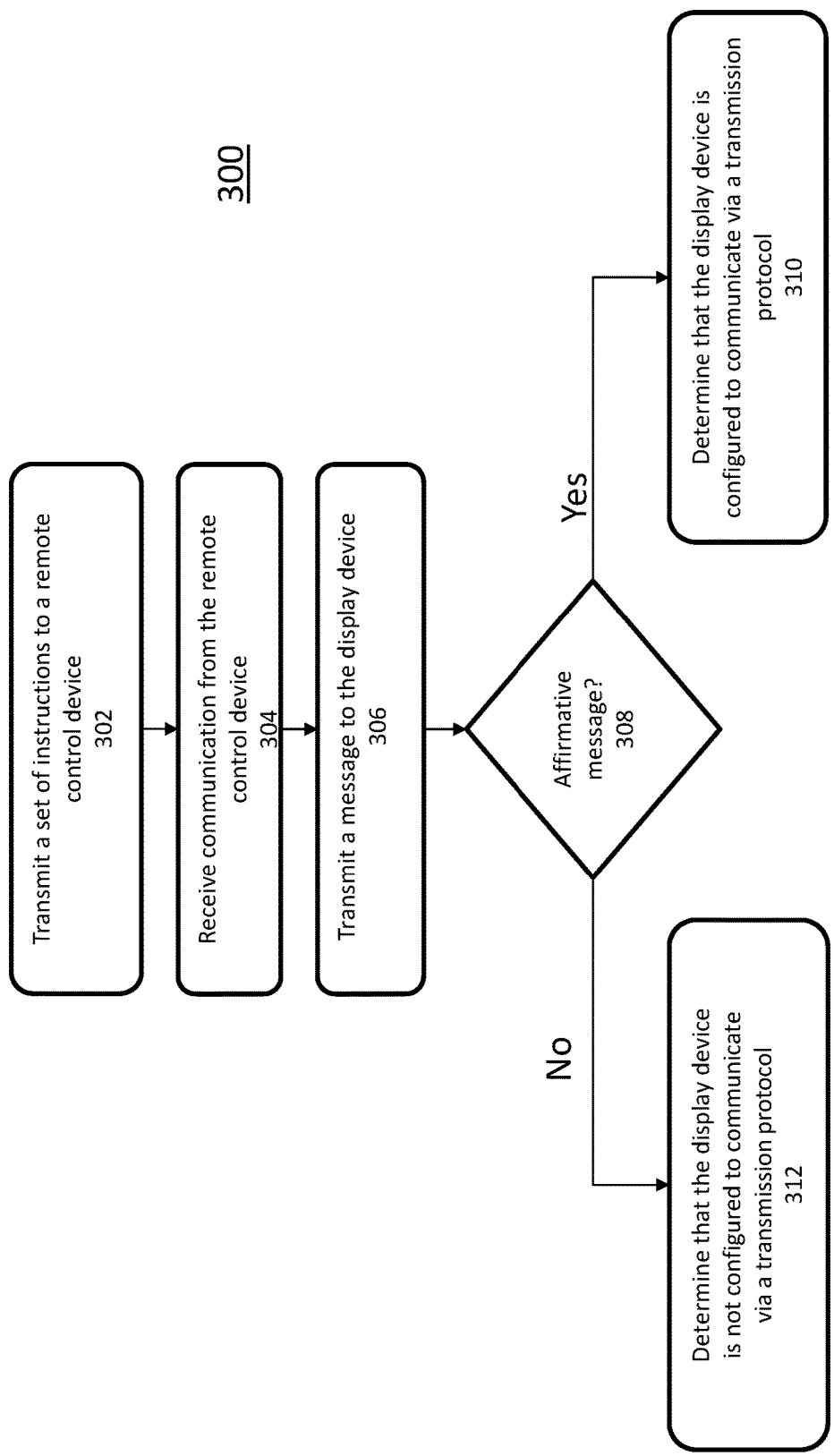
FIG. 3 is a flowchart illustrating a process determining whether a display device is enabled to receive communication using a transmission protocol, according to some embodiments.

FIG. 3 is a flowchart illustrating a process for determining whether a display device is enabled to receive messages using a transmission protocol and/or a transmission protocol over a particular communication channel, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, digital media player 100 transmits a set of instructions to a remote control device 130 including a microphone 132 to detect audio output from speaker 124 coupled to display device 120. Digital media player 100 can also instruct display device 120 to output the audio output using speaker 124. Digital media player 100 can communicate with remote control device 130 using an RF device. Furthermore, digital media player 100 is connected to display device 120 using an HDMI connection. Display device 120 can be a television configured to output audio and video data. Display device 120 can display the video content on display 122 and output the audio data using speaker 124.

In 304, digital media player 100 receives communication from remote control device 130, confirming the detection of the audio output from speaker 124. The communication can be a confirmation message transmitted using an RF device.

In 306, digital media player 100 transmits a message to display device 120 to control the audio output of speaker 124 using a transmission protocol. The message can include a command associated with controlling the volume of the audio output or a mute command. The transmission protocol can be a CEC transmission protocol transmitted using the HDMI connection.

In 308, digital media player 100 determines whether it received an affirmative message or failure message from remote control device 130 indicating whether display device 130 processed the message. In the event that controller 136 determines that an attribute of the audio output is within the predetermined threshold, controller 136 generates an affirmative message indicating that display device 120 successfully processed the message. As an example, the attribute can be the volume of the audio output. Microphone 132 of remote control device 130 can detect and capture audio output from speaker 124. Controller 136 can determine whether the volume of the audio output is within a predetermined threshold. In the event the command in the message was associated with adjusting the volume, controller 136 can determine whether the volume is within the desired range indicated in the command. In the event the message includes a mute command, controller 136 can determine that microphone 132 was unable to detect audio output from speaker 124.

Controller 136 transmits the affirmative message to digital media player 100. In the event controller 136 determines that the attribute of the audio output is outside the predetermined threshold, controller 136 generates a failure message indicating display device 120 did not successfully process the message.

In response to receiving an affirmative message from remote control device 130, which indicates that display device 120 successfully processed the message, method 300 proceeds to 310.

In 310, digital media player 100 determines that display device 120 is configured to communicate via the transmission protocol. Digital media player 100 can transmit all future messages to display device 120 using transmission protocol. The messages can be associated with controlling the audio or video data configured to be output by display device 120.

In response to receiving a failure message from remote control device 130 indicating that display device 120 failed to process the message, method 300 proceeds to 312.

In 312, digital media player 100 determines that display device 120 is not configured to communicate via the transmission protocol.

Figure 4:
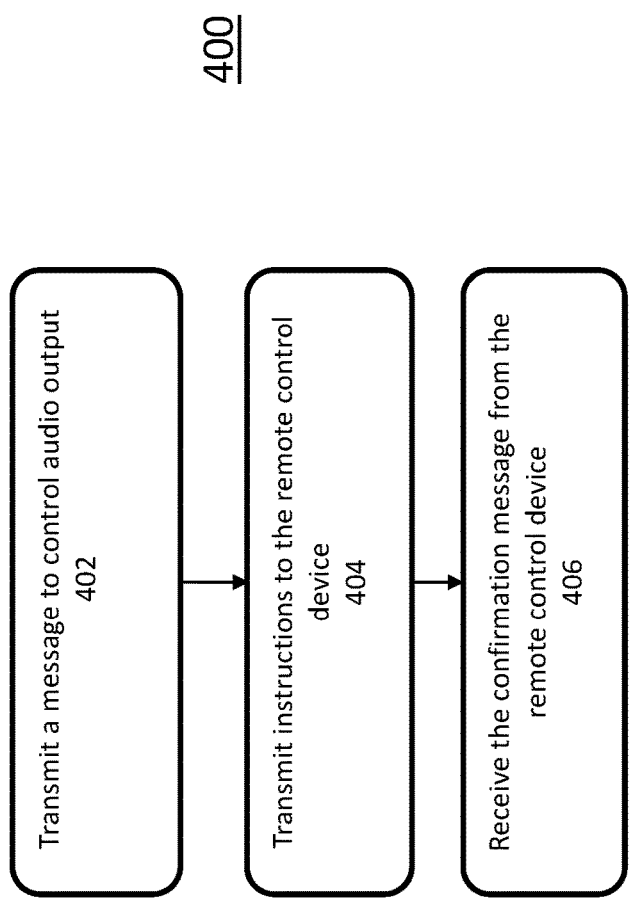
FIG. 4 is a flowchart illustrating a process for determining whether a display device is enabled to receive communication using a communication system, according to some embodiments.

FIG. 4 is a flowchart illustrating a process for confirming that a display device is enabled to receive messages using a communication system. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to that example embodiment.

In 402, digital media player 100 transmits a message to control audio output by speaker 124 coupled to display device 120 using a communication system. The communication system may be an infrared communication system. As such, digital media player 100 may transmit the message via remote control 130's infrared device 138. The message can include a command to control the volume of audio output or a mute command.

In 404, digital media player 100 transmits instructions to remote control device 130 including microphone 132 to confirm the display device processed the message by determining whether the attribute associated with audio output from the speaker is within a predetermined threshold. As an example, the attribute can be volume of the audio output. Microphone 132 of remote control device 130 can detect and capture audio output from speaker 124. Controller 136 can determine whether the volume of the audio output is within the predetermined threshold. In the event the message was adjusting the volume, controller 136 can determine whether the volume is within the desired range indicated in the message. In the event the message included a mute command, controller 136 can determine that microphone 132 was unable to detect audio output from speaker 124. In the event controller 136 determines that the attribute of the audio output is within the predetermined threshold, controller 136 generates a confirmation message indicating that display device 120 successfully processed the message.

In 406, digital media player 100 receives the confirmation message from remote control device 130, indicating that display device 120 successfully processed the message. Digital media player 100 can transmit all future messages to display device 120 using the communication system (e.g., infrared communication). In at least one embodiment in response to determining that a message was not received via a first connection means (e.g., particular transmission protocol over a particular communication channel), another message can be sent via a second connection means (e.g., an alternative protocol over the same connection channel) to determine whether the second connection means should be set as the primary connection means. In an embodiment in response to determining that a message was not received via a first connection means (e.g., a particular communication channel), another message can be sent via a second connection means (e.g., an alternative connection channel) to determine whether the second connection means should be set as the primary connection means. The messages can be associated with controlling the audio or video data configured to be output by display device 120. In at least one embodiment, the digital media player includes the display device. In at least one embodiment the digital media player is a smart television (TV).

In at least one embodiment, the digital media player 100 can identify a second device or set of devices (e.g., output speaker 124) to which it is communicatively coupled. In response to identifying the second device(s), the digital media player can transmit a message to the second device(s) to which its coupled. The second device(s) can transmit a second message (received message and/or an alternative message) in response to the receiving the message from the digital media player. The second message can be an audio message in a frequency audible to the human ear, or a frequency not audible to the human ear. The sensor (e.g., microphone) associated with the remote-control device 130 can listen for the second message, and in response to receiving the second message can transmit a third message to the digital media player. The third message can include a notification that the second message was received, and/or information (e.g., quality, distance) about the second message that was received.

Figure 5:
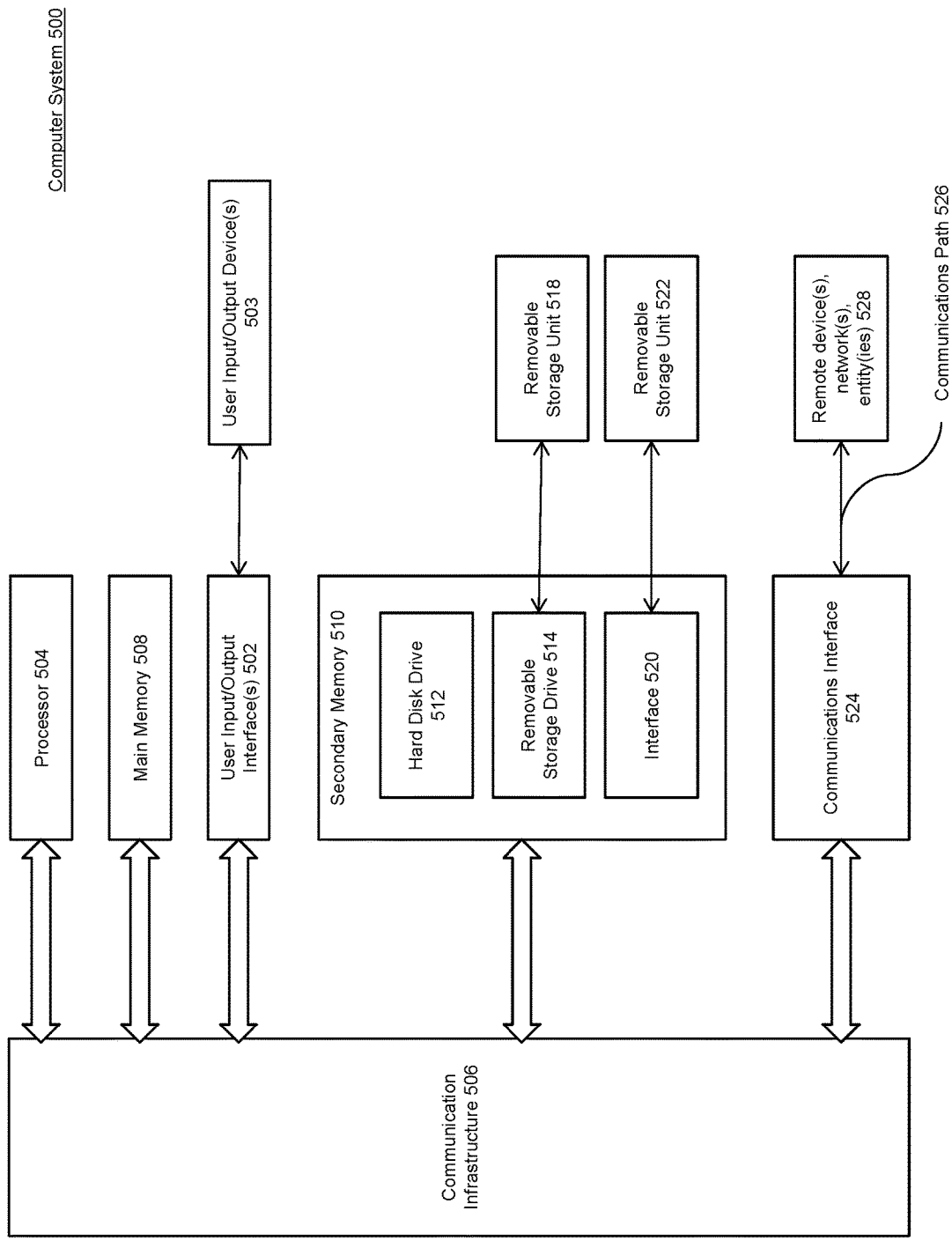
FIG. 5 is an example computer system useful for implementing various embodiments.

Various embodiments can be implemented, for example, using one or more computer systems, such as computer system 500 shown in FIG. 5. Computer system 500 can be used, for example, to implement method 300 of FIG. 3, 400 of FIG. 4. Furthermore, computer system 500 can be at least part of digital media player 100, display device 120, and server 140, as shown in FIG. 1. For example, computer system 500 can transmit message to a display device 120 based on detected audio output by the display device. Computer system 500 can be any computer capable of performing the functions described herein.

Computer system (e.g., computing device, digital media player) 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 can include other means, instrumentalities, or other approaches for allowing computer programs and/or other instructions and/or data to be accessed by computer system 500. Such means, instrumentalities, or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
   executing, by at least one computer processor, an action with respect to a display device to change an audio output by a speaker coupled to the display device;
   transmitting instructions to a remote control device to detect the audio output by the speaker; and
   determining that the display device is operational, in response to receiving an affirmative message from the remote control device indicating that the display device successfully executed the action by detecting an attribute associated with the audio output by the speaker.

2. The computer-implemented method of claim 1, further comprising:
   receiving a request from the remote control device to execute the action.

3. The computer-implemented method of claim 1, wherein the action is powering on the display device or causing change of a video output on the display device.

4. The computer-implemented method of claim 1, wherein the attribute includes content of the audio output by the speaker or a volume level of the audio output by the speaker.

5. The computer-implemented method of claim 1, wherein executing the action with respect to the display device comprises transmitting, to the display device, a second instruction to execute the action using a transmission protocol.

6. The computer-implemented method of claim 5, wherein the transmission protocol is Consumer Electronics Control (CEC).

7. The computer-implemented method of claim 1, wherein the remote control device is positioned within a predetermined distance to the display device.

8. A system comprising:
one or more memories;
at least one processor each coupled to at least one of the one or more memories and configured to perform operations comprising:
executing an action with respect to a display device to change an audio output by a speaker coupled to the display device;
transmitting instructions to a remote control device to detect the audio output by the speaker; and
determining that the display device is operational, in response to receiving an affirmative message from the remote control device indicating that the display device successfully executed the action by detecting an attribute associated with the audio output by the speaker.

9. The system of claim 8, wherein the operations further comprise:
receiving a request from the remote control device to execute the action.

10. The system of claim 8, wherein the action is powering on the display device or causing change of a video output on the display device.

11. The system of claim 8, wherein the attribute includes content of the audio output by the speaker or a volume level of the audio output by the speaker.

12. The system of claim 8, wherein the executing the action with respect to the display device comprises transmitting, to the display device, a second instruction to execute the action using a transmission protocol.

13. The system of claim 12, wherein the transmission protocol is Consumer Electronics Control (CEC).

14. The system of claim 8, wherein the remote control device is positioned within a predetermined distance to the display device.

15. A non-transitory computer-readable medium with instructions stored thereon that, when executed by at least one computing device, cause the at least one computing device to perform operations comprising:
executing an action with respect to a display device to change an audio output by a speaker coupled to the display device;
transmitting instructions to a remote control device to detect the audio output by the speaker; and
determining that the display device is operational, in response to receiving an affirmative message from the remote control device indicating that the display device successfully executed the action by detecting an attribute associated with the audio output by the speaker.

16. The non-transitory computer-readable medium of claim 15, wherein:
the action is powering on the display device or causing change of a video output on the display device, and
the attribute includes content of the audio output by the speaker and a volume level of the audio output by the speaker.

17. The non-transitory computer-readable medium of claim 15, wherein executing the action with respect to the display device comprises transmitting, to the display device, a second instruction to execute the action using a transmission protocol.

18. The non-transitory computer-readable medium of claim 17, wherein the transmission protocol is Consumer Electronics Control (CEC).

19. The non-transitory computer-readable medium of claim 15, wherein the remote control device is positioned within a predetermined distance to the display device.

20. The non-transitory computer-readable medium of claim 15, wherein the operations further comprise receiving a request from the remote control device to execute the action.

* * * * *